United States Patent
Wendt, Jr.

[11] 3,775,843
[45] Dec. 4, 1973

[54] METHOD OF MAKING TEMPERATURE RESPONSIVE APPARATUS

[76] Inventor: Richard E. Wendt, Jr., 348 Maple Ave., Edgewood, Pa. 15218

[22] Filed: Sept. 6, 1972

[21] Appl. No.: 286,639

Related U.S. Application Data

[62] Division of Ser. No. 62,111, Aug. 7, 1970, Pat. No. 3,731,535.

[52] U.S. Cl.................... 29/612, 264/61, 264/66
[51] Int. Cl............................................. H01c 7/04
[58] Field of Search ............... 29/612, 610; 264/66, 264/61; 73/342, 362 CP, 362 SC; 338/22, 25; 323/75 H, 75 N

[56] References Cited
UNITED STATES PATENTS

| | | | |
|---|---|---|---|
| 2,976,505 | 3/1961 | Ichikawa.......................... | 338/22 R |
| 3,295,087 | 12/1966 | Landis et al. ........................ | 338/28 |
| 3,644,864 | 2/1972 | Hirshbrunner et al................ | 338/25 |
| 3,673,538 | 6/1972 | Faxon................................... | 338/25 |

Primary Examiner—Charles W. Lanham
Assistant Examiner—Victor A. DiPalma
Attorney—Hymen Diamond

[57] ABSTRACT

There is disclosed a method of making thermistors included in apparatus for measuring precisely, to 0.01° C., difference in temperature; the thermistors are subjected to the temperatures whose difference is being measured. The logarithm of electrical resistance of each thermistor is proportional to its temperature and the thermistors are connected in a ratiometric circuit for measuring their relative resistances. Each thermistor is a ceramic of ferroelectric material (for example, barium-strontium titanate) formed by mixing powders of different compositions, each composition having a different ferroelectric resistance anomaly, and then firing and oxidizing bodies pressed from the mixture of powders. The powders are derived by reducing separate slurries, each containing a composition, to powder. The mixture of powders is heterogeneous so that the grains of the ceramic include a plurality of particles of powder which microscopically would manifest distinct ferroelectric resistance anomalies if fired along but the macroscopic response of the ceramic is log-linear over a substantial temperature range.

10 Claims, 18 Drawing Figures

PATENTED DEC 4 1973 3,775,843

METHOD OF MAKING TEMPERATURE RESPONSIVE APPARATUS

CROSS REFERENCE TO RELATED APPLICATION

This application is a division of application Ser. No. 62,111 filed Aug. 7, 1970, now U.S. Pat. No. 3,731,535 for "TEMPERATURE RESPONSIVE APPARATUS" (herein called the parent application).

BACKGROUND OF THE INVENTION

This invention relates to measurement of temperature and has particular relationship to measurement of heat flux by observing difference in temperature along the path of the heat flow. Specifically, this invention concerns itself with heat-flux or temperature sensors and temperature-responsive apparatus capable of measuring small temperature differences. Such sensors and apparatus have wide demands in scientific and industrial spheres, for example, in geophysical studies, boiler design studies, architecture, fluid flow meters, automatic psychometry, and rocket research.

The ideal heat-flux sensor should have instantaneous response, zero temperature elevation of the receiving surface, thermal conductance matching that of the volume of material removed for its installation, immunity to noise pickup, durability, low power dissipation (if it is separately excited), stability, precision, linearity with heat flow, and independence of the operating temperature, all in addition to a large output at full-scale heat flux. Actual sensors or temperature-responsive apparatus embody a compromise of these requirements.

Theoretically, heat-flux or temperature measurement may be achieved by reliance upon one or more of the numerous phenomena involving heat. Among these are Phonon Drag, Nernst Effect, Peltier Effect, Seebeck Effect (Thermocouples), Pyroelectricity, Resistance Thermometers, and Thermistors which are mentioned separately but also measure temperature by changes in resistance. (See O.J.M. Smith, "Thermistors, Part I, Static Characteristics," The Review of Scientific Instruments, Vol. 21 No. 4, April 1950, pp 344–350).

In accordance with the teachings of the prior art, attempts have been made to apply thermocouples and thermistors to differential temperature measurement. Thermocouples have been found to be unsatisfactory because they have low sensitivity particularly where the temperature differential is low. Amplification of thermocouple output involves the complexities of DC amplifiers or of interrupters. The most commonly used thermistors and other resistance thermometers have a negative temperature characteristic. Such a characteristic is of mathematic form which presents difficulty in use because difference in temperature is manifested by a difference of temperature reciprocals ($1/T1 - 1/T2$). Attempts have been made to overcome the last-mentioned disadvantage by using networks of separate thermistors and resistors but the resulting structures have large physical dimensions and the resistance-temperature characteristic is not readily controllable or reproducible. (See R.W. Harruff. Linear Temperature Scales from Thermistor Sensors. Instrumentation Technology Vol. 14, No. 6, June 1967 pp. 59–61). Thermistors with positive temperature characteristics have also been proposed but these respond abruptly over a very limited temperature range. (See U.S. Pat. Nos. Ichikawa 2,976,505, 2,981,699, 3,044,968, and 3,209,435).

The parent application is directed to an invention which overcomes the above-described disadvantages of the prior art and provides a precise and reliable heat-flux sensor and temperature measuring apparatus which precisely indicates small temperature difference and which has a readily controllable and reproducible resistance-temperature characteristic of convenient mathematical form.

SUMMARY OF THE INVENTION

The invention of the parent application and this invention arise from the realization that to achieve mathematical convenience a linear temperature-resistance characteristic is required. It has been realized that this characteristic can be achieved with a thermistor whose characteristic can be expressed by the equation $$R(T) = R(T_0) \exp A(T - T_0) \qquad 1$$

where
$R(T)$ is the resistance of the thermistor at temperature $T$;
$R(T_0)$ is the resistance at another temperature $T_0$;
$\exp$ is the base of natural logarithms, sometimes identified as $e$;
$A$ is a constant characteristic of the thermistor; and
$\exp A(T - T_0)$ means $e^{A(T - T_0)}$
Equation 1 may be rewritten $$\text{Log } R(T) - \text{Log } R(T_0) = A(T - T_0) \qquad 2$$

or $$\text{Log } R(T)/R(T_0) = A(T - T_0) = A\Delta T \qquad 3$$

In equations 2 and 3 the log of the resistances of the thermistor at different temperatures is a linear function of the temperature. $T_0$ may be regarded as a reference temperature. Equation 3 is a linear equation from which the difference between the temperature to which a thermistor is exposed and the reference temperature may be determined. The constant $A$ is defined as the sensitivity coefficient of the thermistor.

A thermistor having a characteristic which satisfies equations 1, 2 or 3 is called herein a log-linear thermistor. It is an object of this invention to provide a method of making log-linear thermistors by use of which small temperature differences over predetermined temperature ranges can be readily and accurately determinable.

For each of two thermistors, one subject to temperature $T_1$ and having resistance $R_1(T_1)$ and the other subject to temperature $T_2$ and having resistance $R_2(T_2)$, equation 3 becomes $$A(T_1 - T_0) = \text{Log } R_1(T_1)/R_1(T_0) \qquad 4$$

$$A(T_2 - T_0) = \text{Log } R_2(T_2)/R_2(T_0) \qquad 5$$

Subtracting equation 5 from equation 4:

$$A(T_1 - T_2) = \text{Log } R_1(T_1)/R_2(T_2) - \text{Log } R_1(T_0)/R_2(T_0) \qquad 6$$

Log $R_1(T_0)/R_2(T_0)$ is a constant $K$ characteristic of the two thermistors and $T_1 - T_2$ is $\Delta T$ the difference in the temperatures being measured. The constant $K$ is called the isothermal resistance ratio for that pair of thermistors.

$$\Delta T = 1/A \log R_1(T_1)/R_2(T_2) - 1/A \log K \quad 7$$

Resistances obeying equation 7 can be readily and accurately handled in ratiometric amplifying circuits supplied from an AC supply and including logarithmic conversion of the ratio signals. There may be simple mechanical or electrical offsets to accommodate the isothermal resistance ratio $K$ and the sensitivity may be accommodated by scaling the raw temperature signals.

It has been discovered that log-linear thermistors may be produced by appropriately forming into thermistors selected compositions of materials which are called ferroelectric materials into polycrystalline ceramics. Ferroelectric materials are typified by barium-strontium titanate and differ from negative-temperature thermistor material in that in the ferroelectric material the mechanism of temperature dependence of resistance is the variation of the barrier surface potential while in the NTC materials it is a bulk effect dependent on a mechanism in the mass of the material and not on its surface charge. Thermistors made of ferroelectric materials manifest a sharp change in resistance as the temperature of the thermistor passes through a temperature dependent on the material composition. As the temperature increases through a critical magnitude the resistance rises abruptly; this phenomenon is defined herein as the ferroelectric resistance anomaly or the ferroelectric anomaly. Typical of such materials is barium-strontium titanate (W. Heywang Der Verlauf des Komplxen Widerstands von Ba Ti $O_3$ Maltleitern also Bestatigung der Sperrschichtmodells, Zeitschrift fur angewandte Physik, Vol. 16, No. 1 1963, pp. 1–5, Beriumtitanat als Sperrschichthalbleiter, Solid State Electronics, Vol. 3, 1961, pp. 51–53. Other ferroelectric materials appear in Table 1—1, Partial List of Ferroelectric Crystals, Page 12 Ferroelectric Crystals by F. Jine and G. Shirane, Macmillan 1962.

Ferroelectric materials of different compositions, for example, barium-strontium titanates of different ratio of barium to strontium, have ferroelectric anomalies at different temperatures. In accordance with this invention, ferroelectric materials having different ferroelectric anomalies are combined into thermistors so that the overall response of each thermistor is log-linear. The thermistors are formed by mixing appropriate powders which react to form the different ferroelectric materials, pressing these powders into thermistor forms, firing the forms to produce ceramics and processing, usually oxidizing, the components within the ceramics. The mixing should not be carried so far as to produce homogeneous composite powder; there should be sufficient heterogeneity of the mixture to assure that the different ferroelectric anomalies in the different grains of the thermistors remain distinct. The heterogeneous mixture results in a thermistor whose grains have different compositions; each grain manifests a different ferroelectric anomaly from the others but the macroscopic effect of all grains in the thermistor is a log-linear characteristic.

Typically, the following procedure is practiced. In the interest of concreteness this procedure is here referred to barium-strontium titanate thermistors:

1. Batches of reagent-grade raw materials, corresponding to the desired different ferroelectric anomalies, are blended into slurries separately by wet-ball milling. In the case of (Ba, Sr) $TiO_3$, $BaCO_3$, $SrCO_3$ and $TiO_2$ and a small quantity of the oxide of an electron donor, for example, yttrium, lanthanum, or cerium are milled. The $BaCO_3$ and the $SrCO_3$ are in different ratios in the different batches. The relative quantity of the electron donor is about one-half mol percent.

2. The resulting slurry of each batch is dried, calcined, crushed, remilled, and dried to an intermediate powder, then blended with a binder for pressing. The binder should be such as not to affect deleteriously the ferroelectric properties of the material. About one-half percent by weight of polyvinyl alcohol is satisfactory. The particles of the powder are generally spherical and have diameters of between 1 and 3 micrometers although powder having larger particles may be used. The powders from the separate batches are herein referred to as intermediate powders.

3. Predetermined quantities of the intermediate powders are mixed. The mixing may be effected after the binder is added or it may be effected before the binder is added and the binder added to the mixture. In the practice of this invention with relatively small quantities of powder the mixing is effected in a 16-ounce mixing jar. The jar is about half-filled with the powder and is subjected to end-over-end revolutions at somewhat less than 60 revolutions per minute. Thorough mixing is defined as mixing by rotating the jar about 3,000 revolutions. Light mixing is defined herein as mixing by rotating the jar about 500 to 540 revolutions.

4. The mixed powder held by a binder is cold pressed into the required thermistor shape at pressures of about 10,000 pounds per square inch.

5. The pressed forms are fired at an appropriate average temperature in the neighborhood of 1,400° C. (nominally) to produce ceramics. The firing temperature should be tailored to fit the composition of the forms and to achieve appropriate grain growth. Typically, it has been found for a mixture that 1,328° C. firing produces incomplete grain growth and 1,398° C. firing produces sufficient grain growth. The grains formed are generally spherical and have diameters between 10 and 40 microns or about 30 microns.

6. The fired ceramics are oxidized, in the case of Ba Sr $TiO_3$, oxidized at 1,000° C.

With light mixing the powders from which the thermistors are pressed are heterogeneous and the grains contain different relative quantities of the components. The ferroelectric resistance anomaly of each grain is at a different temperature, and the different anomalies of the ensemble of grains in the thermistor combine to produce the log-linear characteristic.

As to quantities of intermediate powders it has been found that the distribution should be such that there are substantially equal numbers of grains distributed throughout the thermistor having anomalies at substantially equal intervals of the temperature range.

Selection of the intermediate powders for a mixture is guided by two main factors. The practical distribution of the nominal temperatures of the resistance anomalies need not be continuous. The distribution can be discrete, with spacing as wide as 15° C; fine particles of the different powders combine to make ceramic grains of intermediate composition with anomalies at intermediate temperature between the 15° C intervals.

The other consideration is the optimum firing schedule for each intermediate powder when it is processed alone. All powders chosen for a composite should respond well to the same firing schedule (which may not be optimum for any of the group), since there can be only one schedule for the mixture.

Mixing is a critical procedure. It must be thorough enough that the thermistors pressed from a composite have the same average properties from one unit to another and from one neighborhood to another within a single unit. At the same time, mixing must not be so thorough that uniformity extends down to the scale of individual grains (30 micrometers on the average) composing the ceramic, for that would yield a single resistance anomaly at a temperature corresponding to the average composition of the now nearly uniform grains.

In the complex interaction of effects, certain influences can be identified:
  Particle size of the powder(s)
  Agglomeration characteristics of powders and binder
  Moisture content
  Friability of agglomerates and particles
  Vigor of mixing
  Grain size of the fired ceramic (near optimum at 30 micrometers).

With so many variables, no hard and fast prescription can be given. Good results have been obtained with 500 to 540 end-over-end revolutions (<60 rpm) of a 16 ounce mixing jar half-full of powder.

The following Table I shows the principal data on the production of log-linear (Ba, Sr) TiO₃ thermistors in accordance with this invention.

TABLE I. Principal Data on Production of Thermistors

| Item/Name | Composition | Mixing | Firing °C |
|---|---|---|---|
| 1 Powder A | 1/.03/.97 | — | 1400 |
| 2 Powder B | 1/.10/.90 | — | 1400 |
| 3 Powder C | 1/.17/.83 | — | 1400 |
| 4 Powder D | 1/.23/.77 | — | 1400 |
| 5 Powder E | 1/.30/.70 | — | 1400 |
| 6 Powder F | 1/.37/.63 | — | 1400 |
| 7 Powder G | 1/.14/.86 | — | 1400 |
| 8 Mixture 1 | .5/0/1.00;.5/.07/.93 | Thorough | 1400 |
| 9 Mixture 2 | .4/0/1.00;.3/.14/.86; .4/.24/.76 | Light | 1411 |
| 10 Mixture 3 | .33/.10/.90;.33/.20/.80; .33/.30/.70 | Light | 1390 |
| 11 Mixture 4a | (.16/.03/.97;.16/.10/.90; .16/.17/.83; | Light | 1328 |
| 12 Mixture 4b | .16/.23/.77;.16/.30/.70; .16/.37/.63) | Light | 1398 |
| 13 Mixture 5 | (.2/.15/.85;.2/.23/.77; .2/.32/.68;.2/.40/.60; .2/.47/.53) | Light | 1377 |
| 14 Mixture 6a |  | Thorough | 1300 |
| 15 Mixture 6b | .9/.03/.97;.1/.14/.86 | Light | 1300 |
| 16 Mixture 7a |  | Thorough | 1300 |
| 17 Mixture 7b | .1/.03/.97;.9/.14/.86 | Light | 1300 |

Items 1 through 7 present the compositions of intermediate (Ba,Sr)TiO₃ A through G. The ceramics for all these powders were fired at a nominal 1,400°C. In each item the first number of the composition is weight part of the sum of both components, the second is the part of strontium and the third the part of barium. Thus in Item 1 the powder is all (1) 3% Sr and 97% Ba titanate; in Item 2 it is 10% Sr and 90% Ba titanate, etc.

Items 8 through 17 present mixtures. In this case there are several symbols under Composition, each giving a component of the mixture. Thus Item 8 consists of two equal parts (0.5), one part all Ba and the other part 7% Sr and 93% Ba titanate. Item 10 consists of three equal parts (0.33), one 10% Sr and 90% Ba, a second 20% Sr and 80% Ba and a third 30% Sr and 70% Ba titanates.

The second column from the right gives the mixing.

It has been discovered that thermistors produced from appropriate mixtures of Table I are log-linear. The log-linear characteristic is particularly marked for thermistors made from Mixtures 4b and 5. (Items 12 and 13).

BRIEF DESCRIPTION OF THE DRAWING

For a better understanding of this invention, both as to its organization and as to its method of operation, together with additional objects and advantages thereof, reference is made to the following description, taken in connection with the accompanying drawing, in which.

DETAILED DESCRIPTION OF EMBODIMENTS

Figure 1:
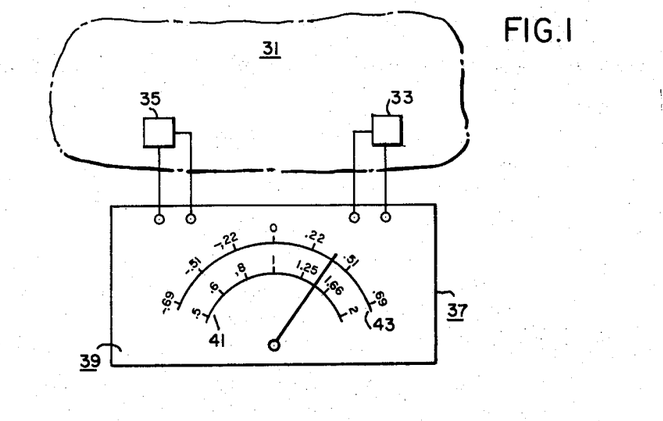
FIG. 1 is a diagrammatic view showing temperature measuring apparatus in which that apparatus produced by the method of this invention is used.

The apparatus shown in FIG. 1 includes a body 31 through which heat flux is to be measured. Thermistors 33 and 35, which are log-linear, are disposed, in heat-interchange relationship, with body 31 at regions along the path of the heat flow. This apparatus also includes a ratiometric circuit device 37 to which the thermistors are connected so that their resistances conditioned by the temperatures at the regions can be compared. The device 37 includes an indicator 39 with a logarithmic scale 41 and a linear scale 43. The scale 43 indicates the actual ratio of the resistance of one thermistor 33 to the other 35. The scale 41 indicates the logarithms corresponding to the ratios.

In the practice of this invention with the apparatus shown in FIG. 1, it has been found that small temperature difference, as low as 0.01° C, along body 31 can be measured and that the measured differences are independent of the average temperature in accordance with Equation 7. From the temperature difference the heat flux can be determined. Within the scope of this invention one of the thermistors 33 or 35 can be replaced by a resistor not responsive to temperature changes and in this way temperature of one of the regions can be measured.

Figure 2:
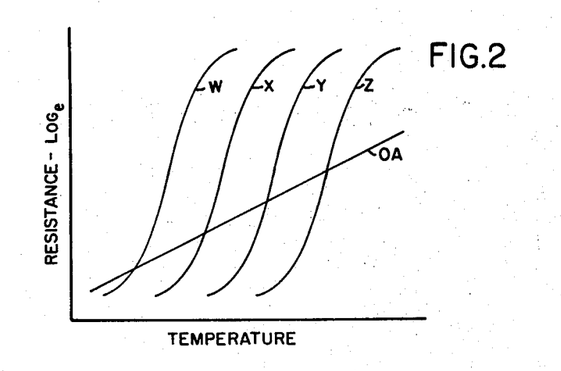
FIG. 2 is a graph illustrating how the log-linear characteristic of thermistors produced in the practice of this invention is achieved.

FIG. 2 is a graph in which the log of the resistance is plotted vertically and temperature horizontally. FIG. 2 is an idealized presentation of the component characteristics and the overall characteristic of a thermistor assumed to be formed from a mixture of four equal parts of different compositions of ferroelectric materials W, X, Y and Z. The corresponding idealized anomaly curves are labeled respectively W, X, Y and Z and separately identifiable. The overall curve, which would be the manifested characteristic of the thermistor, is labeled OA, is linear. The grains forming the thermistors are composed of different percentages of the four component parts and have anomalies between the anomalies W, X, Y, Z. The overall effect of these anomalies is the linear curve OA.

Figure 3:
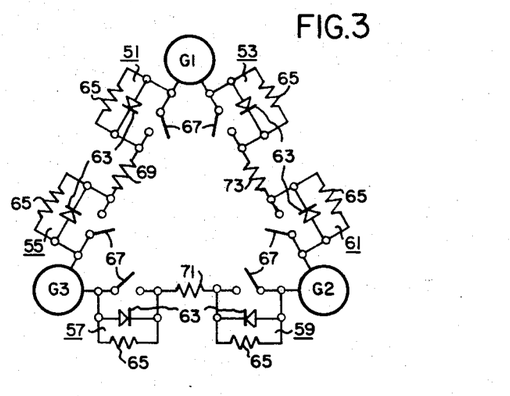
FIG. 3 is a schematic of a part of a thermistor produced in the practice of this invention based on a conceptual model of the part.

The phenomenon shown in FIG. 2 may be understood by considering the network shown in FIG. 3. This network shows the idealized conceptual relationship between three contiguous grains G1, G2, G3 of a thermistor according to this invention, for example, made up of components W, X, Y, Z. Assuming that the grains are spheres of equal diameter there are 12 such grains contiguous to each internal grain. The grains G1, G2, G3 are of different composition and have anomalies at different temperatures. It is assumed that the anomalies are produced by barrier charges which in effect may each be represented by networks 51 and 53, 55 and 57, and 59 and 61 around each grain (only two shown). Each network 51 through 61 includes a diode 63 shunted by a high resistance 65 and a switch 67. The networks 51 through 61 of contiguous grains are interconnected in pairs through low resistances 69, 71, 73 with their diodes 63 opposing. The switches 67 symbolize the anomalies; they are closed when the temperature is below the temperature at which the resistance rises and are open at higher temperature. Since the grains G1, G2, G3 have different compositions, the switches 67 open at different temperatures and, for the mass of grains which forms the thermistor, there is a continuum of such temperatures which, for appropriate relationship of the components of the mixture, produces the log-linear effect. The heterogeneous mixing establishes differences in contiguous grains which enhances the approximation to continuity of the anomalies over the continuum.

Figure 4:
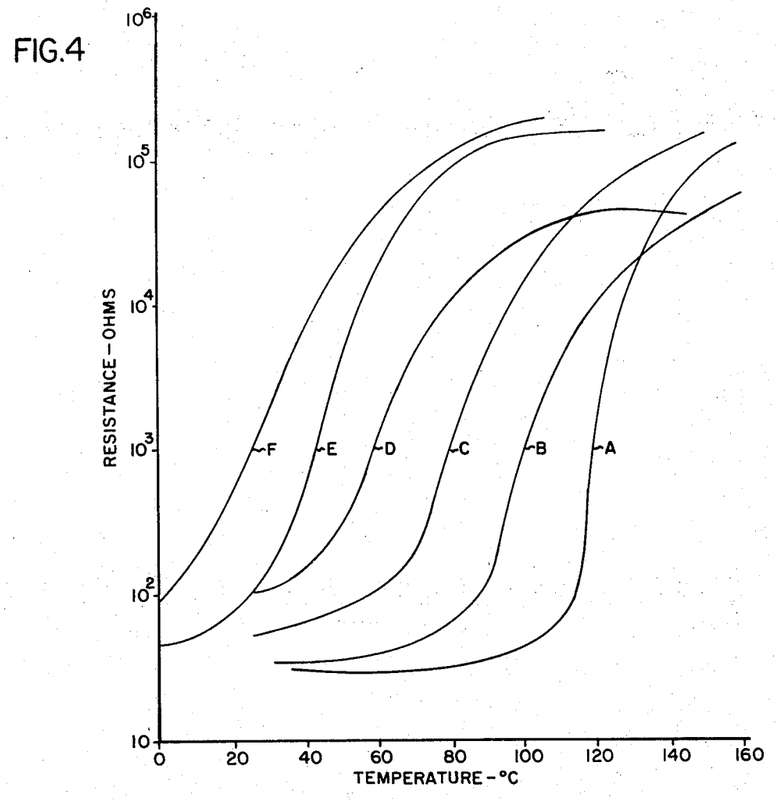
FIG. 4 is a graph showing the respective resistance temperature anomalies for thermistors made from Items 1 through 6 of Table I.

FIG. 4 is a graph which shows plots of the actual anomalies for (Ba, Sr) $TiO_3$ thermistors made from the materials A through F of Table I. Resistance in ohms is plotted vertically and temperature in C degrees horizontally. The vertical scale is logarithmic. The graph shows that the lower the strontium content, the higher the temperature at which the rise in resistance occurs. Materials A through F are used in forming mixture 4 of Table I. The following Table II is a summation of the important properties of powders A through F.

TABLE II. Mixture 4: Composition and Anomaly Temperatures of Component Powders

| Powder | A | B | C | D | E | F |
|---|---|---|---|---|---|---|
| Temp. °C | 115 | 95 | 75 | 55 | 35 | 15 |
| Mol % Sr | 3.3 | 10.0 | 16.7 | 23.3 | 30.0 | 37.0 |
| Mol % Ba | 97.7 | 90.0 | 83.3 | 76.7 | 70.0 | 63.0 |

The respective anomaly temperatures are shown in the second row. Each temperature is derived by reference to the steepest part of the corresponding curve in FIG. 4.

Figure 5:
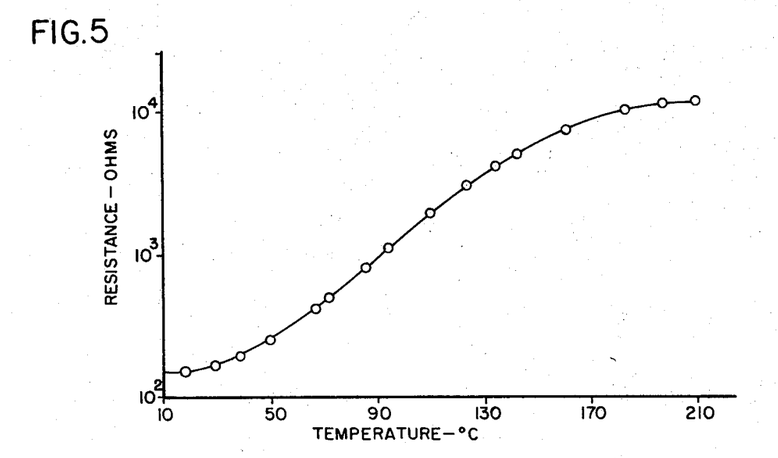
FIG. 5 is a graph showing an actual resistance temperature characteristic of a thermistor made in the practice of this invention of mixture 4b of Table I.
Figure 6:
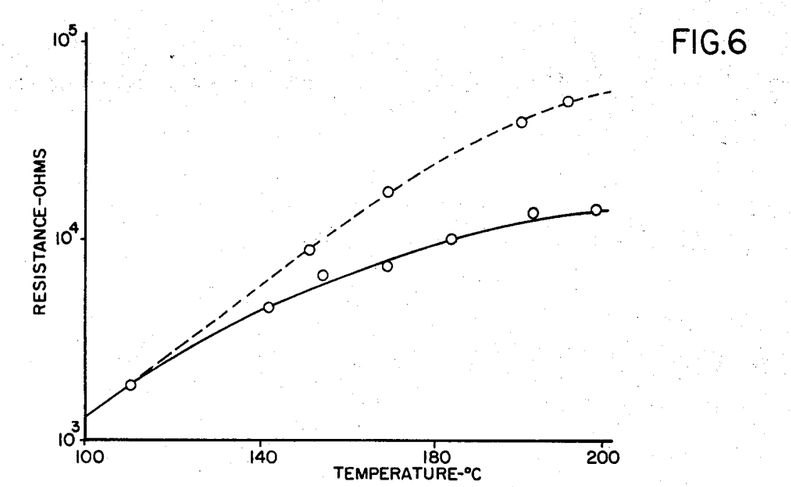
FIG. 6 is a graph of the actual resistance-temperature characteristic of the same thermistor as for FIG. 5 produced in the upper temperature range with an impressed potential substantially smaller than that used to produce FIG. 5.

FIG. 5 is a graph showing the resistance as a function of temperature of thermistors made from mixture 4b of Table I. Resistance is plotted in a logarithmic scale. The curve is effectively linear from 70° C. to 120° C. The data presented in FIG. 5 were obtained with a potential in excess of 6 volts impressed across the thermistors. FIG. 6 is a continuation of the graph of FIG. 5 from 100° C. to 220° C. The broken-line curve was derived from measurements in which only 0.2 volts DC were impressed on the thermistors; the full-line curve by impressing in excess of 5 volts DC on the thermistors. It is seen that the broken line curve extends the linearity from 120° C. to about 190° C. This difference is a consequence of the surface barrier mechanism invoked to explain the performance of ferroelectric ceramics as thermistors.

Figure 7:
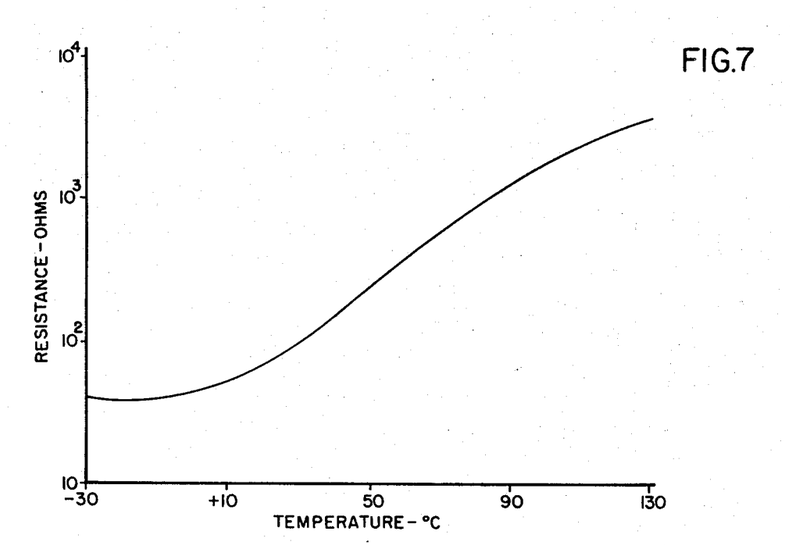
FIG. 7 is another graph similar to FIG. 5 for a thermistor made of mixture 5.

FIG. 7 is a graph similar to FIG. 5 but for thermistors formed of mixture 5. In this case the linear section extends from about 20° C. to about 100° C.

Figures 8, 9, 10:
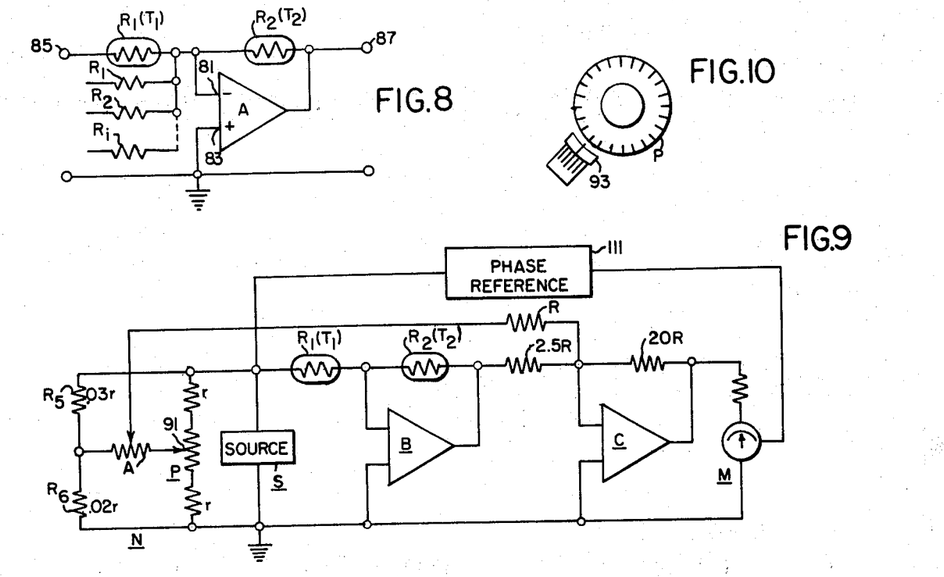
FIG. 8 is a schematic showing the basic amplifier used with apparatus produced in the practice of this invention.
FIG. 9 is a schematic of a ratiometric circuit used with apparatus made in the practice of this invention.
FIG. 10 is a fragmental view showing facilities for presetting an indicator to accommodate the magnitude of the isothermal resistance ratio K.

FIG. 8 shows a basic amplifier circuit used with thermistors produced in the practice of this invention. This apparatus includes a high-gain operational amplifier A having the usual inverting and non-inverting input terminals 81 and 83. The terminal 83 is connected to the reference (ground) conductor. The thermistors having resistances $R_1(T_1)$ and $R_2(T_2)$ are connected in series between the "hot" input terminal 85 and the "hot" output terminal 87 of the circuit. The junction of $R_1(T_1)$ and $R_2(T_2)$ is connected to the inverting input 81. The negative feedback through $R_2(T_2)$ is set to maintain the input 81 at reference (ground) potential as the potential impressed on the input terminal 85 changes.

Assuming a potential $e_i$ impressed between 85 and reference; the output potential $e_o$ is given by:

$$e_o = -e_i\, R_2(T_2)/R_1(T_1)$$

8

Where other signals are impressed through resistors $R_1$ through $R_i$, Equation 8 becomes $$e_o = -R_2(T_2) \sum_1^n \frac{e_i}{R_i}$$

assuming $n$ resistors including $R_1(T_1)$.

The ratio property indicated by Equation 8 is employed in FIG. 9 by amplifier B, which scales the signal source S by the ratio of the two thermistor resistances $R_1(T_1)$ and $R_2(T_2)$. The signal source S, which may be an AC source, is also scaled by the logarithmically-tapered potentiometer rheostat P in bridge network N and added to the ratio output signal of amplifier B. This output signal is of opposite phase to the source S. The signal from P is of opposite polarity to the output ratio signal; the net signal is impressed on amplifier C. When the output voltage of amplifier C is null or zero as indicated by meter M, the output of the logarithmic potentiometer P is equivalent to that of amplifier B. Where the source S is AC, a phase reference signal is impressed through phase reference network 111. By use of different weighting resistors for the ratio output signal and for the potentiometer signal, variations in level or span can be made equivalent, even though they cannot be equal. At the null condition, the setting of the logarithmic potentiometer P is an indicator of the temperature difference between the two thermistors $R_1(T_1)$ and $R_2(T_2)$ provided the thermistor parameters have been properly taken into account. For convenience the resistors R, 2.5R, 20R bear coefficients which indicate their typical magnitudes. The relationship of resistors $r$ in network N and the resistors $R_5$ and $R_6$ is also shown.

In the circuit of FIG. 9 the potentiometer P has a span of voltage from 0.5 to 1.0, at the midpoint 91, to 2.0, referred to the level of signal source S. In adjusting for the sensitivity coefficient A, (see Equation 7), it is necessary to change the effective span of the potentiometer P without affecting the voltage level corresponding to unity ratio or zero temperature difference. One simple means is shown in FIG. 9, where the potential divider $R_5$, $R_6$ established a voltage point equivalent to the unity ratio. Signals from potentiometer P can be attenuated by networks returned to this point without an offset in the zero temperature point of P, while the effective span of the potentiometer P is altered.

Figure 11:
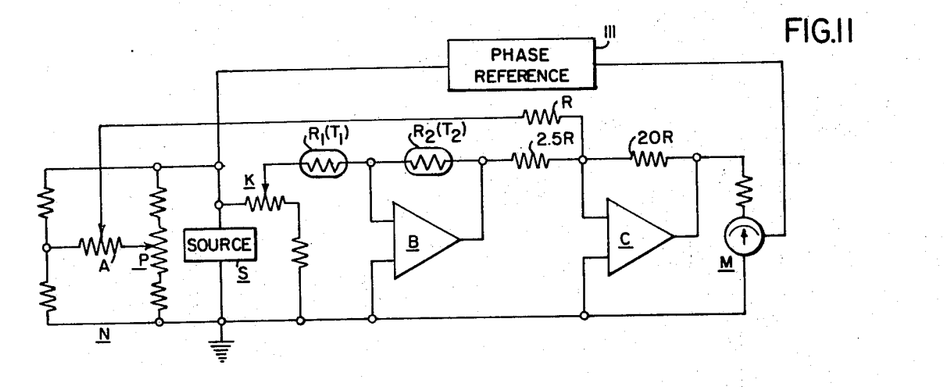
FIG. 11 is a schematic of another ratiometric circuit used with apparatus made in the practice of this invention having electrical means for presetting K.

There is shown no electrical means of adjusting the circuit of FIG. 9 for variations in the isothermal resistance ratio, K. Since the scale on which the setting of potentiometer P is read is linear in temperature difference, there is no advantage in providing separate means of adjusting the reading for the value of K. Since K appears in Equation 7 in an expression with the dimensions of temperature, an adjustable index 93 for the $\Delta T$ scale on potentiometer P permits the temperature offset to be applied mechanically as shown in FIG. 10. If an electrical adjustment is demanded, it can be provided as shown in FIG. 11, where the circuitry embodies Equation 6, and the signal source is scaled according to the value of K before being scaled by the thermistor resistance ratio.

Figure 12:
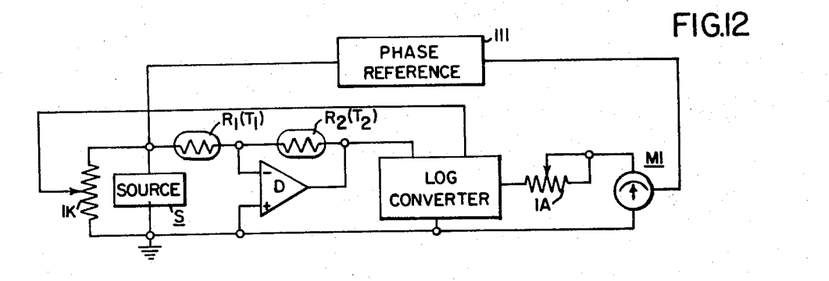
FIG. 12 is a schematic of still another ratiometric circuit used with apparatus made in the practice of this invention also having electrical means for setting K.
Figure 13A:
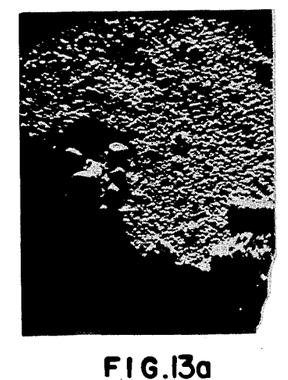
FIGS. 13a and 13b are scanning electron micrographs, at 106 and 427 times magnification respectively, of fractured internal surfaces of thermistors made with mixture 4b of Table I.
Figure 13B:
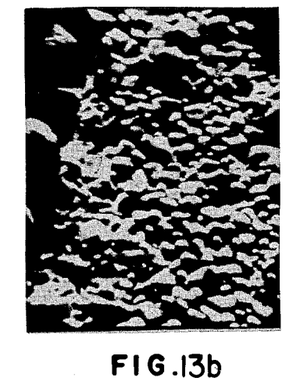
Figure 14:
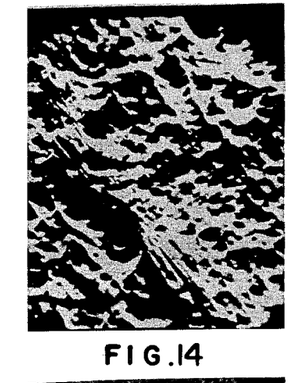
FIG. 14 is a photomicrograph at 200 times magnification, of a polished cut through a thermistor made with mixture 4a of Table I.
Figure 15:
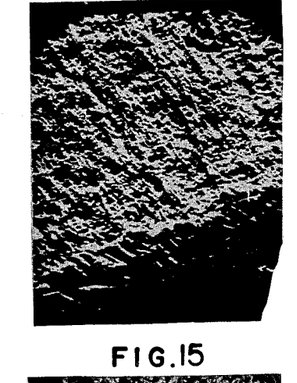
FIG. 15 is a like photomicrograph of a thermistor made with mixture 4b.

As shown in FIG. 12, the output of an operational amplifier D can also be converted into logarithmic values by a log converter 101. In this apparatus the isothermal resistance K is derived from variable resistor 1K and added to the signal from D; the sensitivity coefficient A is set through variable resistor (or rheostat) 1A. The meter M1 can be read in terms of temperature difference.

FIGS. 13 through 16$b$ show what differences, if any, exist among the thermistors composed of mixtures 4$a$, 4$b$ and 6$a$.

Figure 16A:
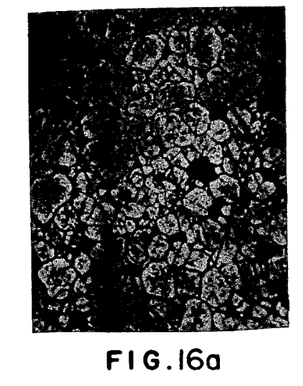
FIGS. 16a and 16b are scanning electron micrographs, at 114 and 457 times magnification, of fractured internal surfaces of a transistor made with mixture 6a of Table I.
Figure 16B:
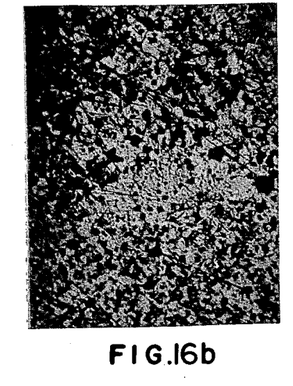

FIGS. 16$a$ and 16$b$ show the effects of the firing of mixture 4$a$ at a lower temperature than 4$b$.

While certain embodiments of this invention have been disclosed, many modifications thereof are feasible. This invention then is not to be restricted except insofar as is necessitated by the spirit of the prior art.

I claim:

1. The method of making thermistors having a predetermined temperature-resistance characteristic which comprises:
   a. producing a plurality of slurries, each including a plurality of chemical components which react to produce a ferroelectric thermistor material, each slurry having a different relationship of said components so that each said material has a different relationship of its components;
   b. reducing each slurry to a powder;
   c. mixing together predetermined quantities of each said powder to produce a resulting composite intermediate powder;
   d. pressing said intermediate powder into thermistor shapes;
   e. firing said shapes at a high temperature in an inert atmosphere to produce ceramic structures of said shapes; and
   f. thermo-chemically treating the components of the shapes, fired as aforesaid, to produce electrical conductivity in the ceramic shapes.

2. The method of making thermistors having a predetermined temperature-resistance characteristic which comprises:
   a. producing a plurality of separate powders, each powder including a plurality of chemical components which react to produce ferroelectric thermistor material, each powder having a different relationship of said chemical components, so that each said material respectively derived from a powder has a different relationship of its components;
   b. mixing together predetermined quantities of each said powder to produce a composite intermediate powder;
   c. pressing said intermediate powder into thermistor shapes;
   d. firing said shapes at a high temperature to produce ceramic structures of said shapes; and
   e. thermo-chemically treating the components of the shapes, fired as aforesaid, to produce electrical conductivity in the ceramic shapes.

3. The method of claim 2 wherein at least some of the powders include an electron donor material.

4. The method of claim 2 wherein each powder is conditioned to be pressed by adding a small quantity of a binder of a material that does not deleteriously affect the ferroelectric properties of the thermistor.

5. The method of claim 2 for producing a barium-strontium titanate thermistor wherein each powder includes barium carbonate, strontium carbonate and titanium dioxide and a small quantity of yttrium oxide as an electron donor, at least the barium carbonate and the strontium carbonate being present in the different powders in different relative quantities, and wherein the binder is polyvinyl alcohol, and wherein the powder is pressed into shapes at a pressure of about 10,000 pounds per square inch, and wherein the pressed shapes are fired in an inert atmosphere at about 1,400° C. and are oxidized at about 1,000° C.

6. The method of claim 2 wherein the mixture of intermediate powders are processed into thermistors each made up of grains, each grain including components of different powders, and the different powders being heterogeneously mixed so that the ferroelectric resistance anomaly of different grains of the thermistor are at different temperatures, each anomaly corresponding to a different relationship of components in said last-named grain.

7. The method of claim 2 wherein equal quantities of six separate powders having the following compositions in weight percent are mixed:

| Powder | Strontium Titanate | Barium Titanate |
|---|---|---|
| 1 | 3 | 97 |
| 2 | 10 | 90 |
| 3 | 17 | 83 |
| 4 | 23 | 77 |
| 5 | 30 | 70 |
| 6 | 37 | 63 |

8. The method of claim 2 wherein equal quantities of five separate powders having the following compositions in weight percent are mixed:

| Powder | Strontium Titanate | Barium Titanate |
|---|---|---|
| 1 | 15 | 85 |
| 2 | 23 | 77 |
| 3 | 32 | 68 |
| 4 | 40 | 60 |
| 5 | 47 | 53 |

9. The method of claim 7 wherein the shapes produced from the powders are fired at about 1,398° C.

10. The method of claim 8 wherein the shapes produced from the powders are fired at about 1,377° C.

* * * * *